United States Patent [19]

Petrides

[11] 4,278,873
[45] Jul. 14, 1981

[54] TEMPERATURE-RESPONSIVE CONTROL MEANS

[75] Inventor: Christie Petrides, Monroe, Conn.

[73] Assignee: General Electric Company, New York, N.Y.

[21] Appl. No.: 117,966

[22] Filed: Feb. 4, 1980

[51] Int. Cl.³ .............................................. H05B 1/02
[52] U.S. Cl. .................................. 219/501; 219/505; 219/497; 307/117; 307/252 UA
[58] Field of Search ............... 219/494, 497, 499, 501, 219/510, 322, 328, 505, 363; 236/15 B; 307/310, 117, 252 B, 252 UA; 323/18, 19

[56] References Cited

U.S. PATENT DOCUMENTS

| 3,684,172 | 8/1972 | Evalds | 236/78 |
|---|---|---|---|
| 3,694,663 | 9/1972 | Pinckaers | 219/510 |
| 3,766,358 | 10/1973 | Gass-Erb | 219/501 |
| 3,784,788 | 1/1974 | Fourny | 219/441 |
| 3,851,861 | 12/1974 | Cummins | 219/311 |
| 3,903,395 | 9/1975 | Hamstra | 219/497 |
| 3,947,656 | 3/1976 | Lodi | 219/505 |
| 4,081,660 | 3/1978 | Uffer et al. | 219/501 |

OTHER PUBLICATIONS

RCA Linear Integrated Circuits ICAN-6182, 10/1973.

*Primary Examiner*—E. A. Goldberg
*Assistant Examiner*—M. Paschall
*Attorney, Agent, or Firm*—George R. Powers; Leonard J. Platt; John F. Cullen

[57] ABSTRACT

A temperature-responsive control system is provided for sensing the temperature of a heating circuit and automatically shutting off the input power when the temperature exceeds an acceptable range. Manually operated means are provided for initiating heating only when the temperature is within the acceptable range.

9 Claims, 3 Drawing Figures

TEMPERATURE-RESPONSIVE CONTROL MEANS

BACKGROUND OF THE INVENTION

1. Field of the Invention

This invention relates to temperature-responsive control means for controlling the electric power supplied to an electric heater and, more particularly, to a temperature-responsive control means for supplying turn-on pulses to a semiconductor controlled heating circuit only when a sensed temperature is within a desired range.

2. Description of the Prior Art

In heater applications, it is desirable that protection be provided against overtemperatures substantially above a desired temperature level. Accordingly, the prior art includes many control systems which utilize sensing means for sensing the temperature of the heater itself or the article being heated, such as water in an electric teakettle, and means for switching off the electric power input to the heater upon the sensing of such an overheated condition. Thereafter when the temperature being sensed drops below the critical level, some prior art control arrangements automatically withhold the further application of electric power until an operator indicates in some fashion, such as through the operation of a manual switch, that the reapplication of power is desired. In many applications such as the previously mentioned electric teakettle, this latter approach is desired since repetitive overheating will only result unless some corrective step is taken. For example in an electric teakettle, overheating will often occur simply because the teakettle has become dry and, under such conditions, it is clearly undesirable that electric power be reapplied before the teakettle is filled again.

In the past, control systems have also been provided for maintaining a desired temperature through the continued on and off cycling of the applied power. In such cases, the sensing of a temperature above the desired level calls for the switching off of the electric power input, but not the continued withholding of power once the sensed temperature drops below the desired level. Various forms of control systems have been used for maintaining a desired temperature, including pulse-generating means for supplying turn-on pulses to a semiconductor switch in series with the heater. These devices have included zero-voltage switching means for supplying the turn-on pulses at the zero-voltage crossing points of the applied electric power. The zero-voltage switching means commercially available include integrated circuits RCA-CA 3058, CA 3059 and CA 3079 produced by RCA Solid State Division, Somerville, N.J. 08876.

SUMMARY OF THE INVENTION

It is an object of this invention to provide a simplified control system for sensing the temperature of a heating circuit and automatically withholding the further application of electric power upon the sensing of an overtemperature condition.

Another object of this invention is to provide a control system using readily available and relatively inexpensive means for sensing a temperature associated with a heating circuit and automatically withholding the further application of electric power upon the sensing of an overtemperature condition.

Yet another object of this invention is to use commercially available means such as zero-voltage switching means to prevent the further application of electric power upon the sensing of an overtemperature condition.

A further object is to provide a control system meeting the foregoing objects while still having simple means for reapplying electric power when the sensed temperature is below the overtemperature level.

Yet another object is to provide the foregoing objects in a control system in which electric power can be reapplied to a heater circuit only upon activation of a manually operated means at a time when the sensed temperature is within an acceptable range.

Briefly stated, in carrying out the invention in one form, a temperature-responsive control means is provided for controlling the electric power input from a source of alternating current electric power to a series electric circuit comprising a heater and a first gate controlled semiconductor switching means. The temperature-responsive control means includes a pulse-generating means having first input means for connection to the same source of alternating current electric power as the heater circuit and first output means connected to the gate of the first semiconductor switching means in the heater circuit for supplying turn-on pulses thereto. A first sensing means for sensing a temperature associated with the heater circuit has an output means connected to a second input of the pulse-generating means, the input signal to the second input having a magnitude within a first range of magnitudes when the sensed temperature is within an acceptable range and a second range of magnitudes when the sensed temperature is within an unacceptable range. A second sensing means for sensing turn-on pulses of the pulse-generating means is coupled to the first output means of the pulse-generating means, the second sensing means having an output means connected to a third input means of the pulse-generating means to supply thereto an input signal having a magnitude within a first range of magnitudes when turn-on pulses are being supplied by the pulse-generating means and a second range of magnitudes when turn-on pulses are not being supplied by the pulse-generating means. The pulse-generating means is responsive to the simultaneous application of both an input signal to its second input means having a magnitude within the respective first range of magnitudes and an input signal to its third input means having a magnitude within the respective first range of magnitudes to generate and deliver turn-on pulses to its first output means such that the first gate controlled semiconductor switching means may be turned on to apply electric power to the heater. When, however, either of the input signals to the second or third input means of the pulse-generating means has a magnitude within the respective second range of magnitudes, the pulse-generating means responds by preventing the generation and delivery of turn-on pulses to its first output means so as to prevent the application of electric power to the heater. Manually operated means are coupled to the second sensing means and are selectively operable to cause the second sensing means to supply to the third input means of the pulse-generating means an input signal having a magnitude within the respective first range of magnitudes whether or not turn-on pulses are being supplied from the first output means, the result being that the production of turn-on pulses may be initiated only upon activation of the manually operated means at a time when the sensed temperature is within the acceptable range.

By further aspects of the invention, the input signal produced by the second sensing means is a voltage signal, and the control means includes means for establishing a reference voltage difference between first and second junctions whenever the pulse-generating means is connected to a source of alternating current electric power. A primary circuit is connected between the first and second junctions, and a third junction in the primary circuit is connected to the third input means of the pulse-generating means. The primary circuit also includes a second semiconductor switching means and biasing means connected to the first output of the pulse-generating means and to the second semi-conductor for switching the second semiconductor to a selected one of its ON and OFF conductive states when pulses are being supplied from the first output means. When the second semiconductor is in its selected state, a signal within the respective first range of magnitudes is supplied from the third junction to the third input means of the pulse-generating means. Also, the manually operated means is a normally open switch coupled to both the means for establishing a reference voltage difference and the biasing means, the momentary manual closing of the manually operated switch biasing the second semiconductor switch to its selected conductive state. In addition, the reference voltage difference is established by the pulse-generating means, and the temperature-responsive means is a negative temperature coefficient resistance element.

BRIEF DESCRIPTION OF THE DRAWINGS

While the novel features of this invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
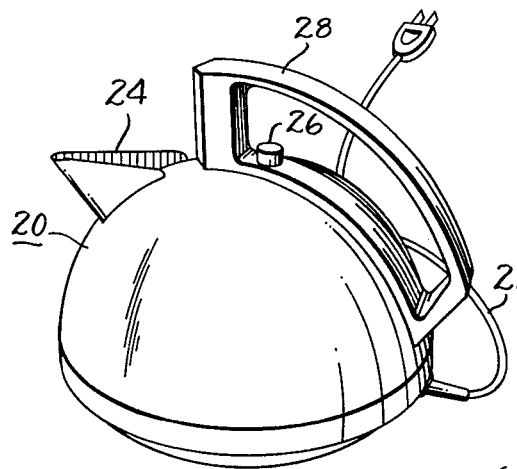
FIG. 1 is a perspective view of an electric teakettle embodying the invention.

Referring first to FIG. 1, an electric teakettle 20 embodying the invention is illustrated. The teakettle 20 has an attached power cord 22 which can be plugged into a power outlet to supply electric power to a heater within the teakettle 20, which has a hollow interior for heating water introduced therein through an open spout 24. The heater is disposed either within the water cavity for direct contact (the heater being appropriately shielded electrically) with the water or in good heat exchange contact with the water cavity and any water therein. In accordance with the invention, a button 26 in the handle assembly 28 of the teakettle 10 is provided for initiating the heating cycle; merely plugging the power cord 22 into a power outlet is insufficient to start the heating cycle. More particularly, the heating cycle is controlled by a temperature-responsive control means of which the button 26 is a part, the control means 30 being illustrated by FIG. 2.

Figure 2:
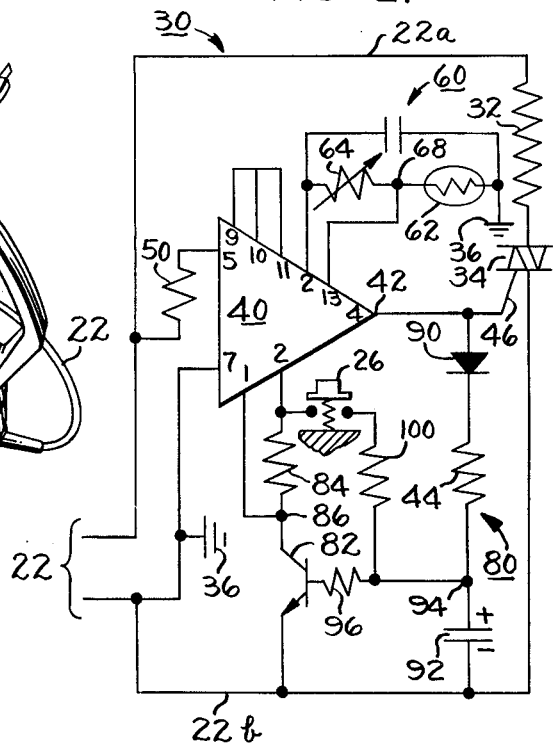
FIG. 2 is a schematic drawing of a preferred form of the temperature-responsive control means.

As shown by FIG. 2, the heater 32 is connected in series with a triac 34 across the sides 22a and 22b of the power cord 22, side 22b being grounded at 36. The control means includes a pulse-generating means 40 having a first output 42 to the gate 46 of the triac 34, a triac being a semiconductor switching element capable of conducting on both positive and negative half cycles of supply voltage.

Figure 3:
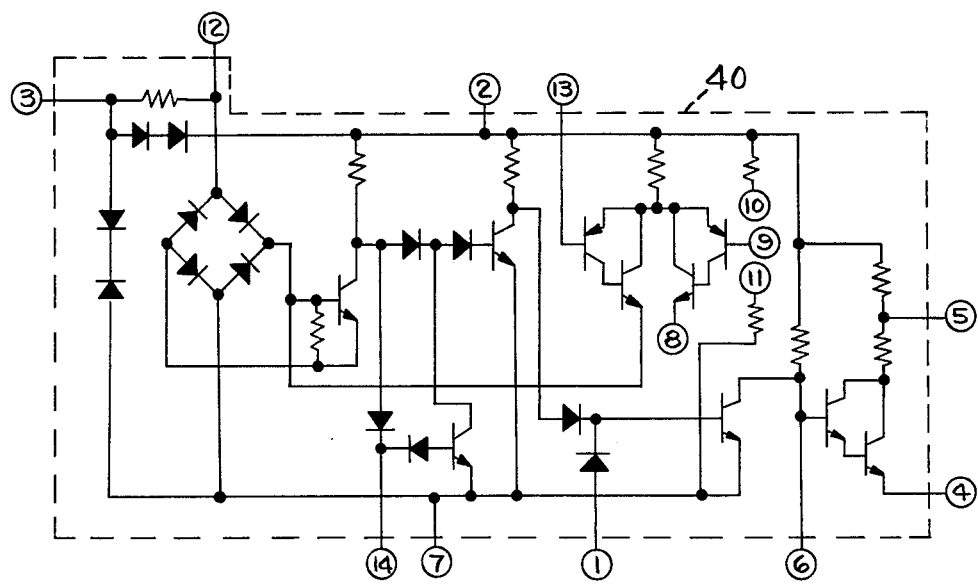
FIG. 3 is a schematic drawing of a commercially available zero-voltage switch used in the control means of FIG. 2.

The pulse-generating means 40 of FIG. 2 is preferably a zero-voltage switch CA 3059 available from RCA Solid State Division, Somerville, N.J. 08876, as described above and as more particularly described by Bulletin ICAN-6182 of July 1973. FIG. 3 of this application discloses the circuit diagram of the CA 3059 integrated circuit in a manner similar to FIG. 2 of the above-identified bulletin. Since the internal operation of the pulse-generating means 40 is not critical to the present invention, FIG. 3 will not be described in detail except to note that the circled junctions therein correspond to the pin identifications of FIG. 2 of this specification. Furthermore, the functions of the pulse-generating means 40 that are important to this application will be described as this specification proceeds. For further understanding of the structure and operation of the integrated circuit 40, attention is directed to the aforementioned bulletin, which is hereby incorporated herein by reference.

The pulse-generating means 40 includes first input means comprising pins 5 and 7, pin 5 being connected through a series voltage-dropping resistor 50 to side 22a of the power cord 22 and pin 7 being connected to side 22b of the power cord 22 and to ground 36. The input means 5 and 7 of the pulse-generating means 40 is thus connected to the same source of alternating current electric power on the heater circuit. Unless, in accordance with the invention, an inhibit signal is supplied to either pin 13 or pin 1, the pulse-generating means 40 will supply a positive turn-on pulse to gate 46 of the triac 34 at the start (zero-voltage crossing) of each positive and negative half cycle of the supply voltage. Following the supply of a turn-on pulse, the triac 34 will permit the conduction through the heater 32 of electric current during the following half cycle of the applied voltage. If, however, an inhibit signal is applied to either of pins 13 or 1, the pulse-generating means 40 will not supply a turn-on pulse to the gate 46, and electric current will not flow through the heater 32 during the subsequent half cycle of supply current.

Still referring to FIG. 2, a first sensing means 60 is provided, the sensing means 60 including a negative temperature coefficient resistance element 62 (thermistor) connected in series with a variable resistance 64 across a substantially fixed voltage drop between pin 2 of the pulse-generating means 40 and ground 36. The junction 68 between the potentiometer 64 and the variable resistance 62 is an output means and is connected to pin 13 of the pulse-generating means 40, the pin 13 being a second input means of the pulse-generating means. The negative temperature coefficient resistance element 62 is physically attached to the heater 32 or is placed in proximity thereto, and the element 62 has small thermal mass so as to be able to rapidly change its resistance in response to changes in temperature of the heater 32. When heating is first initiated, the thermistor 62 has relatively low temperature and high resistance and, since the two resistance elements 62 and 64 act as a voltage divider, the voltage at junction 68 and and pin 13 is relatively high. As the temperature sensed by element 62 increases, its resistance drops, and the voltage at junction 68 and pin 13 drops proportionally. If the water should be used completely or if the water should boil away, the heat sink normally provided by the water will cease to exist, and the heater temperature will increase rapidly. Since the thermistor 62 has low thermal mass, its temperature will also increase rapidly, and the pin 13 will experience a rapidly falling voltage. At a predetermined voltage level at pin 13, the pulse-generating means will respond by ceasing to produce further turn-on pulses, the predetermined voltage level corresponding to the maximim acceptable heater temperature. In other words, the temperature sensing means 60 may be said to supply to the second input means, pin 13, an input signal having a magnitude within a first range of magnitudes (relatively high voltage) when the temperature of the heater 32 is within an acceptable range (relatively low temperature) and a second range of magnitudes (relatively low voltage) when the sensed temperature is within an unacceptable range (relatively high temperature). The magnitude of the maximum acceptable heater temperature can be varied through adjustment of the potentiometer 64.

A second sensing means 80 is also provided, the sensing means 80 being coupled to the first output means 42 (pin 4) and a third input means (pin 1) of the pulse-generating means 40. The second sensing means 80 is responsive to the output of turn-on pulses from pin 4 to supply to the third input means, pin 1, an input signal within a first range of magnitudes (relatively low voltage) when turn-on pulses are being supplied from pin 4 and a second range of magnitudes (relatively high voltage) when turn-on pulses are not being supplied from pin 4. More particularly, the second sensing means 80 comprises a transistor 82 and a resistor 84 connected in series between pins 2 and 7 (22b of line cord 22) of the pulse-generating means 40. The pins 2 and 7 comprises first and second junctions for establishing a substantially fixed reference voltage difference therebetween and across the resistor 84 and the transistor 82. A third junction 86 between the transistor 82 and the resistor 84 comprises the output means of the second sensing means 80 and is connected to the third input means, pin 1. The second sensing means 80 also includes biasing means comprising a diode 90 having its anode connected to the first output means 42, a resistor 44 connected to the cathode of the diode 90, and a capacitor connected between the resistor 44 and the second junction, pin 7, and side 22b of the power cord 22. The junction 94 between the diode 90 and the capacitor 92 is connected through resistor 96 to the base of the transistor 82. When positive turn-on pulses are being supplied at pin 4 by the pulse-generating means 40, the capacitor 92 is charged through diode 90 and is maintained at a voltage sufficient to hold transistor 82 in its ON conductive state. When this occurs, the voltage at the third junction 86 is substantially the same as that at the second junction, pin 7, and the pulse-generating means 40 continues to produce turn-on pulses. If, however, the generation of turn-on pulses should stop for any reason, capacitor 82 will discharge through the transistor 82, which will then switch to its OFF conductive state. Most of the voltage drop between the first and second junctions (pins 2 and 7) will thereafter be across the transistor 82, and the voltage at the third junction 86 will rise proportionately. The increased voltage at the third junction 86 and the third input means (pin 1) acts as an inhibit signal, and the pulse-generating means 40 will thereafter stop producing turn-on pulses. In other words, the second sensing means may be said to supply to the third input means, pin 1, an input signal having a magnitude within a first range of magnitudes (relative low voltage) when turn-on pulses are being supplied and a second range of magnitudes (relatively high voltage) when turn-on pulses are not being supplied.

The manually operated push button 26 is a normally open switch which may be manually depressed to complete a circuit from the first junction (pin 2) to the junction 94 through a resistance 100. If the transistor 82 is in its OFF conductive state and the voltage at junction 94 is low, momentary depression of the button 26 will cause the capacitor 92 to be charged from the relatively high voltage first junction (pin 2) to a voltage sufficiently high to switch the transistor 82 to its ON conductive state whether or not turn-on pulses are being supplied at the first output 42.

The operation of the teakettle 10 will now be described with particular reference to FIG. 2. If the power cord 22 of a cold teakettle 20 is plugged into a power outlet, relatively high voltage will be present at pin 2 of the pulse-generating means 40. Since the temperature sensed by the thermistor 62 is very low, the thermistor 62 has a relatively high resistance, and the voltage at pin 13 will be relatively high. Since the relatively high voltage at pin 13 indicates that the temperature is within an acceptable range, the first sensing means 60 will thus call for the production of turn-on pulses by the pulse-generating means. Since, however, turn-on pulses are not being supplied, the voltage at junction 94 will be insufficient to switch the transistor 82 to its ON conductive condition. As a result, the transistor 82 is OFF, the voltage at pin 1 is high, and the pulse-generating means 40 will not produce and supply turn-on pulses to the triac 34. Accordingly, the heater 32 remains deactivated.

To start heating, the operator must momentarily depress the button 26 to charge the capacitor 92 and thereby switch the transistor 82 to its ON condition. When this occurs, the voltage at pin 1 drops and the pulse-generating means 40 will thereafter transmit turn-on pulses to the triac 34. The triac 34 will turn on at the start of each half cycle of the supply voltage and the heater 32 will start to heat.

If the water should be used up or if, for any other reason, the thermistor 62 senses a temperature that is above the acceptable range, the reduced resistance of the thermistor 62 will cause the voltage at pin 13 to drop into the second unacceptable range of magnitudes. In response thereto, the pulse-generating means 40 will stop supplying turn-on pulses to the triac 34. An immediate result will be the discharge of the capacitor 92 and the switching OFF of the transistor, the signal supplied to the third input means (pin 1) thereby increasing into the unacceptable second range of magnitudes. Thus, inhibit signals are present at both pin 13 and pin 1. If, at this point, the button 26 is depressed, the inhibit signal at pin 1 will be removed, but turn-on pulses will not be produced since an inhibit signal is still present at pin 13. After a period of time, the sensed temperature will drop back into the acceptable range, but turn-on pulses will not be applied since an inhibit signal is still present at pin 1. Under these conditions, however, heating can be started by the depression of button 26 since this will remove the last inhibit signal.

In a practical embodiment of the invention, the circuit of FIG. 2 has been found to work satisfactorily when constructed of the following components and with the following characteristics:

| | |
|---|---|
| pulse-generating means 40 | RCA - CA 3059 |
| transistor 82 | 2N 5172 |
| thermistor 62 | 100K - NTC |
| resistor 50 | 10K - 2 watts |
| resistor 44 | 1K |
| potentiometer 64 | 100K |
| resistor 84 | 39K |
| resistor 96 | 3.9K |
| resistor 100 | 4.7K |
| diode 90 | 1N914 |
| capacitor 92 | 10mf |
| line voltage | 120 volts |
| capacitor 60 | 100mf |

From the foregoing, it will seem that this invention provides a simplified control system for sensing the temperature of a heating circuit and automatically withholding the further application of electric power upon the sensing of an overtemperature conditions. The control means assures that electric power can be applied to a heater circuit only upon activation of a manually operated means at a time when the sensed temperature is within an acceptable range.

While the invention has been particularly shown and described with reference to a preferred embodiment thereof, it will be understood by those skilled in the art that various changes in form, detail and application may be made therein without departing from the spirit and scope of the invention. For example, the integrated circuit CA 3059 may be replaced with equivalent circuitry capable of providing the same functions, and persons skilled in the art could readily provide such circuitry. Also, the various component values given above are suitable for only one application; if another temperature is desirable, the components values would have to be changed accordingly. It is therefore intended that all such modifications and changes be included within the spirit and scope of the appended claims.

What is claimed as new and is desired to secure by Letters Patent is:

1. Temperature-responsive control means for controlling the electric power input from a source of alternating current electric power to a series electric circuit comprising a heater and a first gate controlled semiconductor switching means, said temperature-responsive control means comprising:

a pulse-generating means having first input means for connection to the same source of alternating current electric power as the heater circuit and first output means connected to the gate of the first semiconductor switching means in the heater circuit for supplying turn-on pulses thereto, first temperature sensing means for sensing a temperature associated with the heater circuit, said first temperature sensing means having an output means connected to a second input means of said pulse-generating means, said first temperature sensing means being responsive to the sensed temperature to supply to said second input means an input signal having a magnitude within a first range of magnitudes when the temperature is within an acceptable range and a second range of magnitudes when the temperature is within an unacceptable range, second sensing means coupled to said first output means of said pulse-generating means and having an output means connected to a third input means of said pulse-generating means, said second sensing means being responsive to the output of said first output means to supply to said third input means an input signal having a magnitude within a first range of mangitudes when turn-on pulses are being supplied from said first output means and a second range of magnitudes when turn-on pulses are not being supplied from said first output means, said pulse-generating means being responsive to the simultaneous application of both an input signal to said second input means having a magnitude within said respective first range of magnitudes and an input signal to said third input means having a magnitude within said respective first range of magnitudes to generate and deliver turn-on pulses to said first output means, and said pulse-generating means being responsive to either an input signal to said second input means having a magnitude within said respective second range of magnitudes or an input signal to said third input means having a magnitude within said respective second range of magnitudes to prevent the generation and delivery of turn-on pulses to said first output means, and manually operated means coupled to said second sensing means selectively operable to cause said second sensing means to supply to said third input means an input signal having a magnitude within said respective first range of magnitudes whether or not turn-on pulses are being supplied from said first output means, whereby the production of turn-on pulses may be initiated only upon activation of said manually operated means at a time when the sensed temperature is within the acceptable range.

2. Temperature-responsive control means as defined by claim 1 in which said temperature-responsive means is a negative temperature coefficient resistance element.

3. Temperature-responsive control means as defined by claim 1 in which the input signal produced by said second sensing means is a voltage signal and in which said temperature-responsive control means further comprises means for establishing a reference voltage difference between first and second junctions whenever said pulse-generating means is connected to a source of alternating current electric power, said second sensing means comprising:

a primary circuit including a second semiconductor switching means having ON and OFF conductive states connected between said first and second junctions, said output means of said second sensing means comprising a third junction within said primary circuit between said first and second junctions, the voltage at said third junction being within said first range of magnitudes when said second semiconductor switching means is in a first one of its ON and OFF conductive states and the voltage at said third junction being within said second range of magnitudes when said semiconductor switching is in a second one of its ON and OFF conductive states, and biasing means connected to said first output means of said pulse-generating means and to said second semiconductor switching means said biasing means being responsive to turn-on pulses supplied from said first output means to bias said second semiconductor switching means to the first one of its ON and OFF conductive states when turn-on pulses are being supplied from said first output means.

4. Temperature-responsive control means as defined by claim 3 in which said manually operated means is a normally open switch coupled to both said means for establishing a reference voltage difference and said biasing means such that momentary manual closing of said manually operated switch biases said second semiconductor switching means to said first one of its ON and OFF conductive states.

5. Temperature responsive control means as defined by claim 3 in which said first and second junctions are terminals of said pulse-generating means, whereby the reference voltage difference is established by said pulse-generating means.

6. Temperature-responsive control means as defined by claim 5 in which the voltage at said first junction is higher than the voltage at said second junction and in which said primary circuit comprises a resistor and said second semiconductor switching means connected in series between said first and second junctions respectively, and said third junction is intermediate said resistor and said second semiconductor switching means, the voltage at said third junction being relatively low and within said first range of magnitudes when said second semiconductor switching means is in its ON conductive state and the voltage at said third junction being relatively high and within said second range of magnitudes when said second semiconductor switching means is in its OFF conductive state.

7. Temperature-responsive control means as defined by claim 6 in which said temperature-responsive means is a negative temperature coefficient resistance element.

8. Temperature-responsive control means as defined by claim 6 in which said biasing means comprises:
   a diode having its anode connected to said first output means,
   a capacitor connected between the cathode of said diode and said second junction, and
   means connecting the junction between said diode and said capacitor to a control terminal of said second semiconductor switching means so as to bias said second semiconductor switching means to it ON conductive state when turn-on pulses are being supplied by said pulse-generating means at said first output means.

9. Temperature-responsive control means as defined by claim 8 in which said manually operated means is a normally open manually operated switch means, said control means further comprising circuit means coupling said normally open manually operated switch means between said first junction and said control terminal of said second semiconductor switching means such that momentary closing of said manually operated switch means biases said second semiconductor switching means to it ON conductive state.

* * * * *